US006976404B2

(12) United States Patent
Kerner et al.

(10) Patent No.: US 6,976,404 B2
(45) Date of Patent: Dec. 20, 2005

(54) STEERING WHEEL UNIT FOR A MOTOR VEHICLE

(75) Inventors: Wolfgang Kerner, Eutingen (DE); Martin Kreuzer, Kleinwallstadt (DE); Anke Nigrin, Ilmenau (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 48 days.

(21) Appl. No.: 10/247,382

(22) Filed: Sep. 19, 2002

(65) Prior Publication Data

US 2003/0075004 A1 Apr. 24, 2003

(30) Foreign Application Priority Data

Sep. 19, 2001 (DE) ........................................ 101 46 175

(51) Int. Cl.[7] ................................................ G05G 1/10

(52) U.S. Cl. ...................... 74/552; 280/731; 280/728.1; 280/728.2

(58) Field of Search ........................... 74/552; 454/152; 280/731, 728.1, 728.2

(56) References Cited

U.S. PATENT DOCUMENTS

| | | | | |
|---|---|---|---|---|
| 3,675,505 A | * | 7/1972 | Henning | 74/552 |
| 4,123,948 A | | 11/1978 | Zeller | |
| 4,368,454 A | | 1/1983 | Pilatzki | |
| 4,644,817 A | * | 2/1987 | Albrecht et al. | 74/552 |
| 4,771,650 A | * | 9/1988 | Kerner | 74/498 |
| 4,962,947 A | * | 10/1990 | Nagata et al. | 280/777 |
| 6,264,235 B1 | | 7/2001 | Battermann et al. | |
| 6,312,011 B1 | * | 11/2001 | Dohring et al. | 280/731 |
| 2002/0074781 A1 | * | 6/2002 | Schutz et al. | 280/731 |

FOREIGN PATENT DOCUMENTS

| | | | |
|---|---|---|---|
| DE | 3013996 | 10/1981 | 74/552 |
| DE | 4328562 C1 | 8/1994 | 74/552 |
| DE | 19714838 | 10/1998 | 74/552 |
| DE | 10020085 A1 | 7/2001 | 74/552 |
| GB | 2068314 A * | 8/1981 | 74/552 |

OTHER PUBLICATIONS

English Abstract for DE 4328562C1.

* cited by examiner

*Primary Examiner*—Vinh T. Luong
(74) *Attorney, Agent, or Firm*—Tarolli, Sundheim, Covell & Tummino L.L.P.

(57) ABSTRACT

A steering wheel unit for a motor vehicle, in particular a passenger car, comprises a connection hub which may be non-rotatably connected with a steering shaft of a steering device, a steering wheel rim which is non-rotatably connected with the connection hub by spokes, and a central piece which is mounted by a spacer element to the connection hub so as to be rotatable relative to the steering shaft and the steering wheel rim. The steering wheel unit further comprises a coupling device which arrests the central piece with respect to a rotational movement of the steering wheel rim. The spacer element has a first end which is non-rotatably connected with the central piece, and has a second other end which is rotatably mounted to the connection hub and constructed as a crash element. The crash element fails after a predetermined failure value of a force driving the central piece towards the connection hub. The steering wheel rim is supported by its spokes on the central piece at least in a direction leading from the steering wheel rim to the connection hub and the spokes are rotatably mounted on the central piece in a region of the support.

11 Claims, 2 Drawing Sheets

STEERING WHEEL UNIT FOR A MOTOR VEHICLE

TECHNICAL FIELD

The invention relates to a steering wheel unit for a motor vehicle, in particular a passenger car.

BACKGROUND OF THE INVENTION

Such a steering wheel unit is known for example from the earlier German Patent Application 100 20 085.0 of Apr. 22, 2000, and has a connection hub which may be non-rotatably connected with a steering shaft of a steering device. The steering wheel unit has, in addition, a steering wheel rim which is non-rotatably connected with the connection hub by means of spokes. Furthermore, a central piece is provided, which usually has an impact body and also an airbag unit. The central piece is mounted by means of a spacer element to the connection hub so as to be rotatable relative to the steering shaft and the steering wheel rim. This spacer element has a first end which is non-rotatably connected with the central piece, and has a second end which is rotatably mounted to the connection hub. Furthermore, the spacer element is constructed as a crash element which fails after a predetermined failure value of a force driving the central piece towards the connection hub. The generic steering wheel unit has, in addition, a coupling device which arrests the central piece with respect to a rotational movement of the steering wheel rim. In the known steering wheel unit, this coupling device is formed by a magnetic force mechanism with magnet arrangements which are integrated into the structure of the steering wheel unit.

From DE 43 28 562 C1 there is known a further steering wheel arrangement, which has a central piece which is rotatably mounted relative to the steering shaft and the steering wheel rim, and is arrested by means of a coupling device with respect to a rotational movement of the steering wheel rim. In this steering wheel unit, the coupling device is formed by a toothed-wheel gearing with bevel gears, a carrier plate, on which the bevel gears are mounted, being driven by rotational adjustments of the steering wheel rim.

In the case of a crash, it may happen that the driver of the vehicle strikes onto this steering wheel unit, generally firstly hitting the steering wheel rim projecting furthest into the interior of the vehicle. Usually, this steering wheel rim is constructed as a crash element by means of a corresponding shaping of its spokes, so that the spokes yield under an absorption of impact energy, with the steering wheel rim moving towards the connection hub. Such forward movement of the steering wheel rim leads to the driver of the vehicle hitting the central piece in a chronologically staggered manner during the impact. As the spacer element, by means of which the central piece is supported on the connection hub, also forms a crash element, this support also fails in the case of sufficiently great forces.

This type of construction has the result that with the impact of the driver of the vehicle onto the steering wheel unit, firstly a first force peak is formed, when the forces transferred from the vehicle driver to the steering wheel rim build up until the failure of the spokes. Furthermore, with a chronological delay, a second force peak is formed, when the forces transferred from the vehicle driver to the central part increase until the failure of the spacer element. As each force peak increases the effective deceleration forces on the vehicle driver, it is desired to reduce or eliminate the second force peak. A reduced or absent second force peak can reduce the risk of injury on impact of the vehicle driver onto the steering wheel unit, whereby the human protection effect of the steering wheel unit, designed as a safety component, is improved.

The present invention deals with the problem of further developing a steering wheel unit of the type initially mentioned, with regard to its human protection effect.

BRIEF SUMMARY OF THE INVENTION

According to the invention, a steering wheel unit for a motor vehicle comprises a connection hub for being non-rotatably connected with a steering shaft of a steering device, a steering wheel rim which is non-rotatably connected with the connection hub by means of spokes, and a central piece which is mounted by means of a spacer element to the connection hub so as to be rotatable relative to the steering shaft and the steering wheel rim. The steering wheel unit further comprises a coupling device which arrests the central piece with respect to a rotational movement of the steering wheel rim. The spokes have an end attached to the steering wheel rim and an opposite, inner end with a spoke support. The spacer element has a first end which is non-rotatably connected with the central piece, and has a second other end which is rotatably mounted to the connection hub and constructed as a crash element. The crash element fails after a predetermined failure value of a force driving the central piece towards the connection hub. The steering wheel rim is supported by means of its spokes on the central piece at least in a direction leading from the steering wheel rim to the connection hub and the spokes are rotatably mounted on the central piece in a region of the spoke support.

The invention is based on the general idea of supporting the steering wheel rim by means of its spokes on the central piece towards the connection hub. Through this type of construction, forces which are introduced from the vehicle driver into the steering wheel rim in the case of a crash are also transferred onto the central piece without a delay. This has the result that the forces transferred from the vehicle driver to the steering wheel unit build up to a value at which the spokes of the steering wheel rim and the spacer element of the central piece fail at the same time. This means that with the steering wheel unit according to the invention, only one single force peak can build up, whereby the risk of injury on impact onto the steering wheel unit is reduced.

Expediently, the central piece may have a bearing carrier which is non-rotatably connected therewith, the spokes being rotatably mounted to and supported by the bearing carrier, and the first end of the spacer element being non-rotatably fastened to this bearing carrier. On such a bearing carrier, the mounting of the spokes on the central piece can be designed particularly favorably such that this is also suitable for the transfer of the impact forces. Such a bearing carrier can, in addition, be constructed so as to be sufficiently stable in a particularly simple manner, in order to reliably introduce to the spacer element the forces which are to be supported.

In a particular embodiment, each spoke can bifurcate in a section facing away from the steering wheel rim and can have a first leg fastened to the connection hub and a second leg supported by and mounted to the central piece. The spokes are thereby able to be produced at a relatively favorable cost. The shaping of the individual legs can be optimized with regard to the respectively associated function. For example, the first leg is shaped for torque transmission and impact force transmission between the steering wheel rim and connection hub, whereas the second leg is shaped for force transmission between the steering wheel rim and the central piece. In particular, the first leg can have a deformation section which following a predetermined supporting force in the form of a rolling/bending deformation brings about a failure with absorption of energy of the respective spoke.

In another embodiment, each spoke can be constructed in two parts, a first spoke part being fastened to the steering wheel rim and mounted to and supported by the central piece, whereas a second spoke part is fastened to the first spoke part and to the connection hub. This embodiment makes possible, in particular, an optimized choice of material with regard to the respective function of the spoke parts. Whereas the first spoke part is to produce a direct transfer of force for entraining the central piece in the case of a crash, the second spoke part can be constructed such that in the case of a crash it is deformed primarily in a plastic manner under energy absorption. Expediently, the second spoke part has a deformation section which has already been mentioned above.

According to a particular further development, the two spoke parts can be supported and fastened on each other such that the spoke parts, in sections adjoining this support, are in alignment to each other and continue into each other almost without any step between them. Through this type of construction the transfer of force in the case of a crash from the first spoke part to the second spoke part is favored, so that a reproducible behavior results for the desired deformation, in particular of the second spoke part.

As the spacer element in the case of a crash is already intended to fail under relatively small forces, it is expedient to merely construct the spacer element to be so stable that in fact permissible forces or moments, which the driver of the vehicle exerts accidentally or arbitrarily onto the central piece, can be supported without damage to the spacer element. According to an advantageous embodiment, the spacer element can be constructed at its second end as an annular body, at least two webs projecting from the annular body which are spaced apart from each other in the peripheral direction of the annular body and are connected with the central piece. Through this type of construction, the stability of the spacer element, in the direction of the forces occurring in the case of a crash; is considerably reduced. Furthermore, this type of construction ensures an increase to the deformation path for the central piece, because the webs, which are spaced apart from each other, run together “on block” relatively late in the case of a deformation. A further reduction to the stability of the spacer element can be achieved in that the webs are constructed so as to be waisted, i.e. are realized so as to have a narrowed portion.

A further characteristic is produced by an embodiment in which the spokes are non-rotatably connected with the connection hub by means of a hub plate. By means of this hub plate, additional structural space can be obtained in the direction of the shaft axis, which space is able to be used to increase the deformation path of the central piece.

Further important features and advantages of the invention will be apparent from the sub-claims. It is to be understood that the features mentioned above and to be further explained below are not only able to be used in the respectively indicated combination, but also in other combinations or alone, without departing from the scope of the present invention.

Preferred embodiments of the invention are explained in further detail in the following description, with the same reference numbers referring to the same or functionally identical or similar components.

DETAILED DESCRIPTION OF THE PREFERRED EMBODIMENTS

Figure 1:
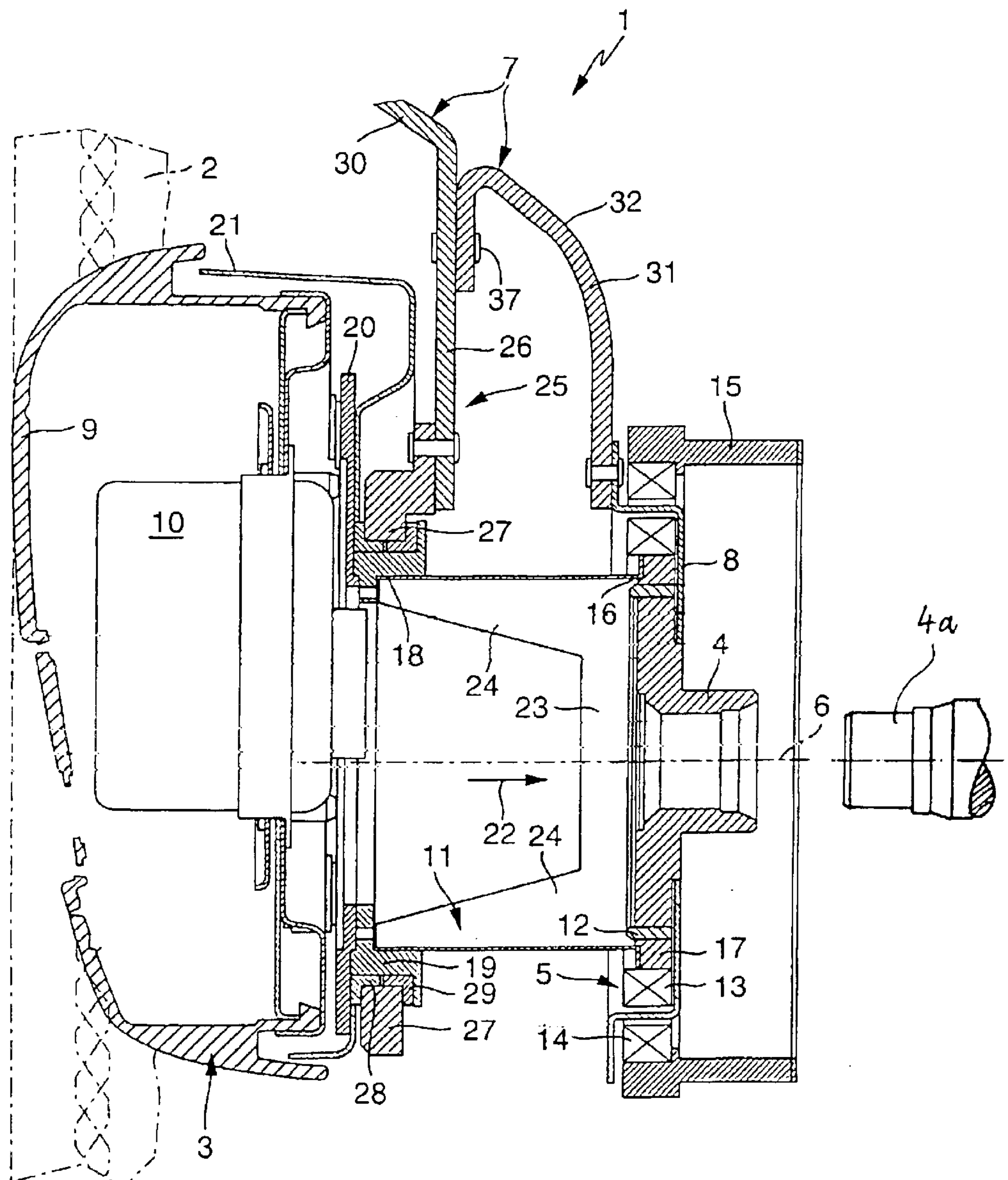
FIG. 1 shows a longitudinal sect ion through a steering wheel unit according to the invention in a first embodiment.

According to FIG. 1, a steering wheel unit 1 in accordance with the invention comprises a steering wheel rim 2, which is only partially illustrated, a central piece 3, a connection hub 4 and a coupling device 5. The connection hub 4 is able to be non-rotatably connected with a steering shaft **4*a* of a steering device of a motor vehicle, in particular a passenger car. A longitudinal axis or rotation axis of this steering shaft is designated by 6 in FIG. 1. The steering wheel rim 2 is non-rotatably secured to the connection hub 4 by means of several spokes 7, of which only one is illustrated here by way of example. Here, the connection of the spokes 7 to the connection hub 4 takes place by means of a hub plate 8 (see also FIG. 2), which is non-rotatably fastened both to the connection hub 4 and to the spokes 7. The hub plate 8 is constructed in a cup shape with the cup opening facing the steering wheel rim 2, so that the connection hub 4 is arranged countersunk in the hub plate 8**.

The central piece 3 has an impact body 9 and usually contains an airbag unit 10. This central piece 3 and the airbag unit 10 will not follow any rotation, if the unit made up of the steering wheel rim 2, the spokes 7 and the hub plate 8 with the connection hub 4 fastened thereto, will be turned by the driver. Thus, on actuation of the steering wheel the central piece 3 and the impact body 9 will always maintain the same angular attitude with respect to the driver. For this, the central piece 3 is rotatably mounted on the connection hub 4 by means of a spacer element 11 and a sliding bearing 12 a relative rotation between central piece and steering wheel takes place in the region of the sliding bearing. In order to arrest the central piece with respect to a rotational movement of the steering wheel rim, a contactless working coupling device 5 is provided which will be explained below.

In the preferred embodiment shown here, the coupling device 5 is formed by a magnetic force mechanism which has two magnet units 13 and 14 arranged in a ring shape. Whereas one magnet unit 13 is non-rotatably connected with the spacer element 11, the other magnet unit 14 is non-rotatably connected with a magnet carrier 15 which in turn is able to be non-rotatably connected to a component fixed to the vehicle, such as, for example, an external tubular casing of the steering device. A holding force or a holding moment is transferred in a contact-free manner via the magnet units 13 and 14 to arrest the central piece 3.

The spacer element 11 is fastened at its end 16, associated with the connection hub 4, to a ring 17, which carries the sliding bearing 12 radially on the interior and carries the magnet unit 13 radially on the exterior. At its other end 18, facing the central piece 3, the spacer element 11 is non-rotatably arranged on a ring-shaped bearing carrier 19, which in turn is firmly and non-rotatably connected to a module plate 20 of the central piece 3. On this module plate 20, the components of the central piece 3 are arranged, for example impact body 9, airbag unit 10, bearing carrier 19 and a covering element 21. The spacer element 11 is constructed as a crash element such that it fails as of a predetermined failure value of a force driving the central piece 3 corresponding to an arrow 22 towards the connection hub 4. For this purpose, the spacer element 11 consists substantially of an annular body 23 which is mounted on the connection hub 4, and of several webs 24 which project from the annular body 23 towards the central piece 3 and are fastened thereon or on its bearing carrier 19. In the embodiment shown in FIG. 1, two webs 24 are provided, which are arranged lying diametrically opposite each other on the annular body 23. Likewise, in another embodiment, more than two webs 24 may also be arranged, spaced apart from each other, in peripheral direction of the annular body 23. The shaping of the web 24 is selected according to FIG. 1 such that the webs 24 become narrower starting from the annular body 23 up to the bearing carrier 19. Expediently, the spacer element 11 is dimensioned with regard to its stability, e.g. by corresponding shaping, material strength and choice of material, such that the spacer element 11 can in fact transfer permissible forces in the direction of the arrow 22 and also torques with respect to the rotation axis 6 without damage.

According to the invention, the steering wheel rim 2 rests by an inner end of spokes 7 at a spoke support designated by 25 against the central piece 3. This spoke support 25 provides that forces acting on the steering wheel rim 2 are transferred in the direction of the arrow 22 via the spokes 7 onto the central piece 3, so that in the case of a crash, with a displacement movement of the steering wheel rim 2 in the direction of the arrow 22, the central piece 3 is entrained by means of the spokes 7. The supporting of the spokes 7 takes place here by means of a support arm 26 which is firmly connected with a support ring 27. This support ring 27 is mounted radially and axially on the bearing carrier 19 by means of sliding bearing rings 28 and 29, with the support ring 27 being rotatable relative to the bearing carrier 19. The strength values of the individual components are coordinated with each other such that by means of the support arms 26 of the spokes 7, such great forces can be applied in the direction of arrow 22 onto the spacer element 11 that the latter is deformed or fails deliberately. The term “failure value” stands for a force as of which there will occur a plastic deformation of the spokes and the spacer element. To this end, the material strengths of the spokes 7 and also of the support ring 27 and of the bearing carrier 19 are distinctly greater than those of the spacer element 11.

The hub plate 8 likewise has a relatively small wall thickness, whereby it can penetrate without difficulty a gap between the magnet units 13 and 14. Through this type of construction, the connection hub 4 can be placed in a direction towards the steering shaft, whereby the spacing between connection hub 4 and central piece 3 is increased. In a corresponding manner, the available deformation path also increases thereby. The hub plate 8 is expediently formed from a material which does not disturb, or only negligibly disturbs, the magnetic force transmission between the magnet units 13 and 14.

According to the embodiment shown in FIG. 1, the spokes 7 are constructed in two parts. A first spoke part 30 is fastened to the steering wheel rim 2 at a point which can not be seen here. Approximately at the level of the support ring 27, the first spoke part 30 is angled towards the rotation axis 6, the thus angled section then forming the support arm 26. A second spoke part 31 on the one hand is firmly connected, for example by means of a riveting 37, with the first spoke part 30, and is non-rotatably arranged on the connection hub 4 by means of the hub plate 8. According to the preferred embodiment shown here, the connection of the two spoke parts 30 and 31 to each other takes place such that the two spoke parts 30 and 31, in the sections adjoining each other, are in alignment to each other and continue into each other almost without any step between them. This type of construction on the one hand improves the force transmission between the two spoke parts 30, 31 and on the other hand makes possible an aesthetic improvement of the external contour of the steering wheel unit 1. The second spoke part 31 has a step-like deformation section 32 which yields after a predetermined failure value of a force driving the steering wheel rim 2 in the direction of the arrow 22 and thus makes possible an energy-absorbing rolling/bending deformation of the second spoke part 31.

The type of construction of the spokes 7 in two parts makes possible a suitable choice of material for the two spoke parts 30 and 31. Whereas the first spoke part 30 can be designed for transmission of the failure forces to the spacer element 11, it is expedient to optimize the second spoke part 31 with regard to as high an energy absorption effect as possible in the rolling/bending deformation.

Figure 2:
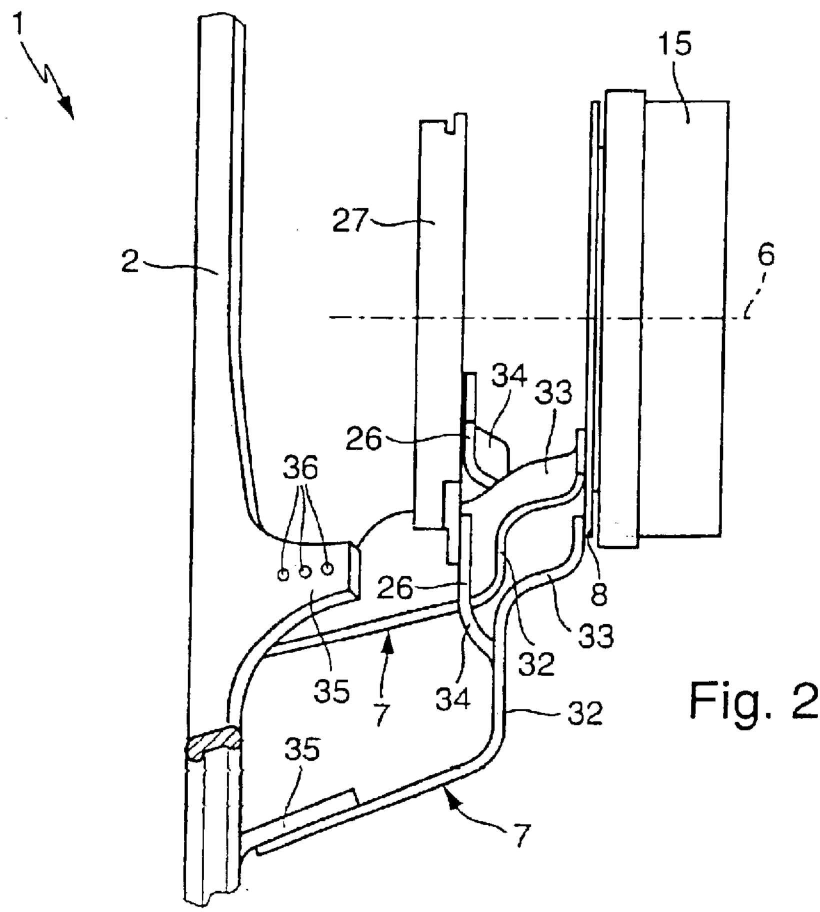
FIG. 2 shows a side view onto the steering wheel unit, but in a second embodiment.

According to another embodiment in FIG. 2, the spokes 7 can be constructed in one piece and bifurcate in a section facing away from the steering wheel rim 2. Through this bifurcation, the spokes 7 then each have a first leg 33 and a second leg 34. Whereas the first leg 33 is fastened by means of the hub plate 8 to the connection hub 4, the second leg 34 rests by means of the support ring 27 against the central piece 3, which is not illustrated in FIG. 2. Accordingly, the second leg 34 forms the support arm 26 in this embodiment. The section of the spoke 7 having the bifurcation is bent approximately between the connection hub 4 or magnet carrier 15 and central piece 3 or support ring 27 towards the rotation axis 6, whereby in this section, respectively in the first leg 33, again a deformation section 32 is formed, which in the case of a crash makes possible a rolling/bending deformation of the spoke 7. The shaping of the two arms 33 and 34 can expediently again be adapted to their function. In the case of a crash, the forces acting on the steering wheel rim 2 can be transferred via the spokes 7 and their second leg 34 to the central piece 3 or to its spacer element 11 situated underneath. As soon as the spokes 7 fail, therefore as soon as the rolling/bending deformation of the spokes 7 takes place, the spacer element 11 also automatically fails, so that the entire steering wheel unit 1 yields with only one stress peak in the case of a crash. The second legs 34 act here as it were as entrainment means for the central piece 3.

The connection of the spokes 7 to the steering wheel rim 2 takes place here by means of extensions 35 formed on the steering wheel rim 2, to which the spokes 7 are secured, for example by welding spots 36.

Figure 3:
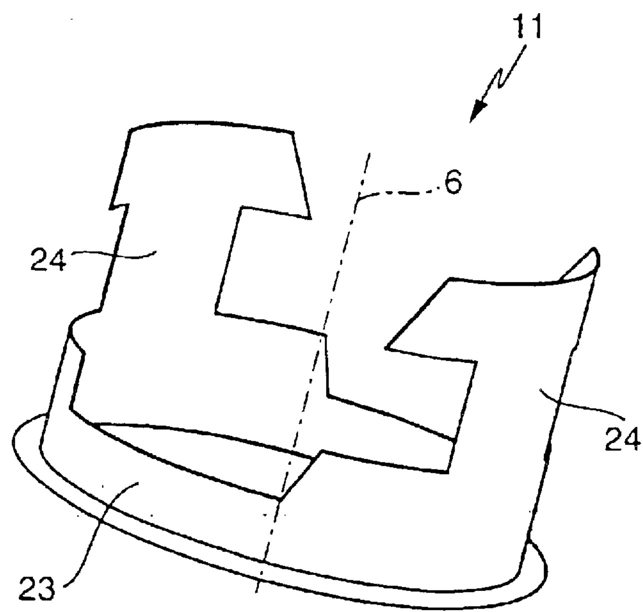
FIG. 3 shows a perspective view onto a spacer element of the steering wheel unit in a particular embodiment.

According to FIG. 3, the spacer element 11 in a particular embodiment can have two waisted webs 24, which originate from the annular body 23 and in so doing extend coaxially and in the form of a circular arc shape to the rotation axis 6. The spacer element 11 here forms a crash element, the bearing strength of which scarcely exceeds the permissible forces or moments which occur during normal operation and which are exerted by the driver onto the steering wheel. At the same time, the construction of the two webs 24 ensures a relatively large deformation path parallel to the rotation axis 6, because the webs 24 are only squeezed together or “moved on block” after a relatively large deformation path to such an extent that a further deformation is only possible in connection with a steep increase in force.

The failure value of the spacer element 11 is smaller, preferably considerably smaller, than the failure value of the spokes 7. In this way, it is ensured that through the entrainment of the central piece 3 by the spokes 7 engaging thereon, the force necessary for the failure of the spokes 7 does not rise or only rises negligibly.

Although the example embodiment shown here shows a coupling device 5 constructed as a magnetic force mechanism, the present invention is not restricted to such an embodiment of the coupling device 5. The coupling device 5 can, in particular, also be realized by a toothed-wheel gearing.

What is claimed is:

1. A steering wheel unit for a motor vehicle, said steering wheel unit comprising:

a connection hub non-rotatably connected to a steering shaft;

a steering wheel rim non-rotatably connected to said connection hub by spokes, said spokes having an inner end with a spoke support;

a central piece mounted to said connection hub by a spacer element, said central piece being rotatable relative to said steering shaft and said steering wheel rim;

a coupling device for preventing rotational movement of said central piece relative to said steering wheel rim, said spacer element having a first end non-rotatably connected to said central piece and a second end rotatably mounted to said connection hub, said spacer element constructed as a crash element failing when a predetermined force moves said central piece towards said connection hub, said second end of said spacer element being an annular body, said spacer element having at least two webs projecting from said annular body, said webs being spaced apart around a perimeter of said annular body, said webs being connected to said central piece.

2. The steering wheel unit according to claim 1, wherein said central piece is non-rotatably connected to a bearing carrier, said spokes being rotatably connected to said bearing carrier, said first end of said spacer element being non-rotatably connected to said bearing carrier.

3. The steering wheel unit according to claim 1, wherein al least one said spoke has a first spoke part and a second spoke part, said first spoke part interconnecting said steering wheel rim and said central piece, said second spoke part inter connecting said first spoke part and said connection hub.

4. The steering wheel unit according to claim 3, wherein said second spoke part comprises a deformation section in a section adjoining said connection hub, said deformation section yielding when a predetermined force moves said steering wheel rim towards said connection hub.

5. The steering wheel unit according to claim 3, wherein said first spoke part supports said second spoke part such that said first spoke part adjoins, and is aligned with, said second spoke part.

6. The steering wheel unit according to claim 1, wherein said webs have a narrowed portion.

7. The steering wheel unit according to claim 1, wherein said spokes are non-rotatably connected to said connection hub by a hub plate.

8. The steering wheel unit according to claim 1, wherein each spoke bifurcates in a section facing away from said steering wheel rim and has a first leg fastened to said connection hub and a second leg supported by and mounted to, said central piece.

9. The steering wheel unit according to claim 8, wherein said spokes, in a section adjoining said connection hub, form a deformation section which yields after a predetermined failure value of a force driving said steering wheel rim towards said connection hub, said first leg comprising said deformation section.

10. The steering wheel unit according to claim 9, wherein said predetermined force of said spacer element is smaller than said predetermined failure value of said spokes.

11. A steering wheel unit for a motor vehicle, said steering wheel unit comprising:

a connection hub non-rotatably connected to a steering shaft;

a steering wheel rim non-rotatably connected to said connection hub by spokes, said spokes having an inner end with a spoke support;

a central piece mounted to said connection hub by a spacer element, said central piece being rotatable relative to said steering shaft and said steering wheel rim;

a coupling device for preventing rotational movement of said central piece relative to said steering wheel rim, said spacer element having a first end non-rotatably connected to said central piece and a second end rotatably mounted to said connection hub, said spacer element constructed as a crash element failing when a predetermined force moves said central piece towards said connection hub, said coupling device having a magnetic force mechanism with at least two magnet arrangements.

* * * * *